March 31, 1953  E. L. ZIENTOWSKI  2,633,308
FISHING REEL
Filed March 24, 1949
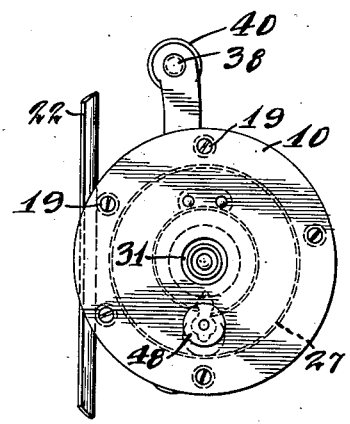
FIG-2-
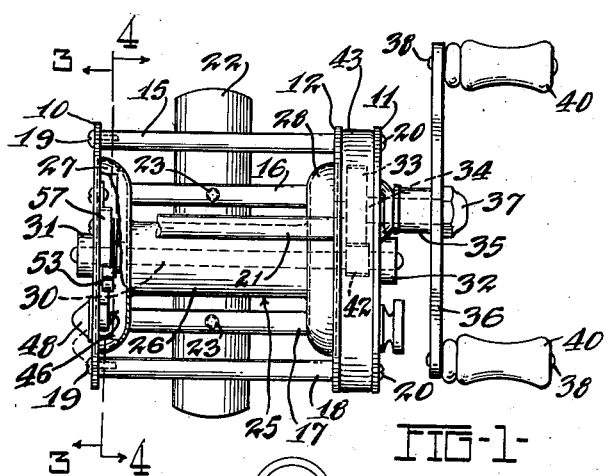
FIG-1-
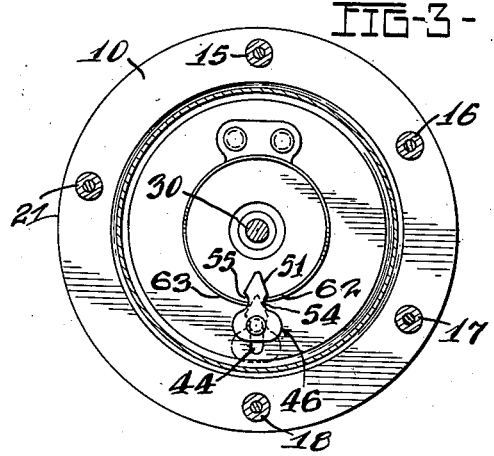
FIG-3-
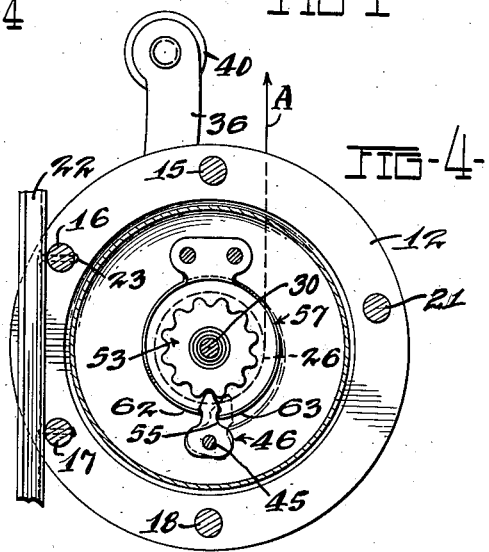
FIG-4-
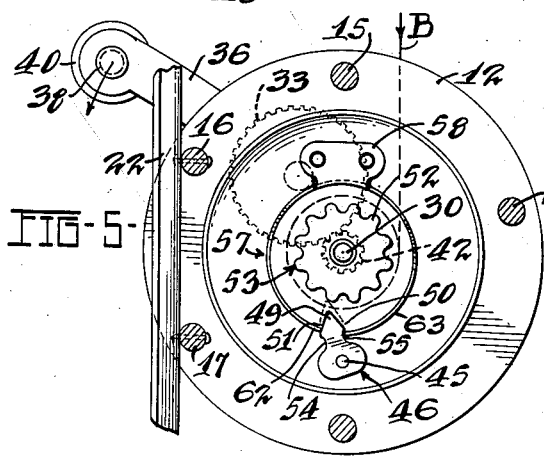
FIG-5-
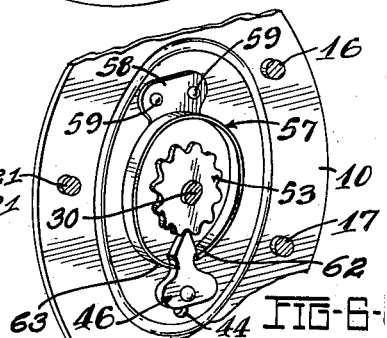
FIG-6-
INVENTOR.
Edward L. Zientowski
BY
Harry O. Ernsberger
ATTY.

Patented Mar. 31, 1953

2,633,308

UNITED STATES PATENT OFFICE 2,633,308

FISHING REEL

Edward L. Zientowski, Toledo, Ohio

Application March 24, 1949, Serial No. 83,275

2 Claims. (Cl. 242—84.6)

This invention relates to fishing reels and more especially to means for retarding free rotation or spinning of the spool or drum carrying the supply of line.

The conventional types of reels which have been made and sold for several years have embodied a so-called drag mechanism or device for preventing free spinning action of the spool or drum on which the fishing line is wound. A common type of device includes a toothed wheel or sprocket associated with the line carrying drum adapted for cooperation with a pawl which when manually moved to effective position is maintained by a spring means in the locus of the teeth of the gear wheel to apply or set up a braking force or drag to prevent free spinning of the drum in both directions of rotation. In devices of this nature heretofore used a manual adjustment of the pawl brings the latter both into or away from the teeth of the sprocket wheel to render the drag operative or inoperative.

An object of the present invention is the provision of a drag which is operable in one direction of rotation of the drum but which will be automatically biased or moved out of engagement with the line carrying drum upon rotational movement in the opposite direction.

Another object of the invention resides in a drag for fishing reels wherein the pawl of the drag mechanism is resiliently maintained in engagement with a toothed wheel carried by the drum when the drum turns in one direction and which cooperates with a biasing means whereby movement of the drum in the opposite direction of rotation moves the pawl out of the locus of the toothed wheel.

Another object of the invention resides in the provision of a drag mechanism for incorporation in a fishing reel wherein the drag is effective to retard spinning movement of the reel when rotated in one direction, the drag being automatically rendered ineffective when the drum of the reel is rotated in the opposite direction.

Still another object of the invention resides in a drag mechanism for fishing reels involving a slidable pawl cooperable with a toothed wheel carried by the drum in combination with means engageable with the pawl so as to impart differential bias to the pawl for rendering the same effective or ineffective dependent upon the direction of rotation of the drum of the reel.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view of a fishing reel embodying the device of my invention;

Figure 2 is an end view of the reel shown in Figure 1;

Figure 3 is a sectional view taken substantially on the line 3—3 of Figure 1;

Figure 4 is a sectional view taken substantially on the line 4—4 of Figure 1;

Figure 5 is a view similar to Figure 4 illustrating the pawl moved out of engagement with the toothed or sprocket wheel; and Figure 6 is an isometric view of a frame end plate showing the drag mechanism of my invention.

While I have illustrated an arrangement of my device as embodied in a fishing reel it is to be understood that I contemplate the utilization of the drag or brake mechanism with any type of rotating means where it is desired to retard rotary movement in one direction and permit free and unrestricted movement in the opposite direction.

Referring to the drawings in detail, the fishing reel construction is inclusive of a frame having a pair of end plates 10 and 11 and an intermediate plate 12, all three plates being generally of circular configuration and of substantially the same diameter. The plate 10 is joined to the plates 11 and 12 by means of bars or rods 15, 16, 17, 18, and 21, the rods being secured respectively to the end plates 10 and 11 by means of screws 19 and 20. The bars or rods 16 and 17 are secured to an elongated plate 22 having its lower surface transversely curved to fit upon the handle or grip portion of a fishing rod which is secured thereto by suitable clamping means (not shown). The plate 22 is fixedly secured to the rods 16 and 17 by means of rivets 23. Disposed between the plates 10 and 12 is a means for carrying the fishing line which means is in the form of a spool or drum 25 having a central hub 26 and bell shaped end flanges 27 and 28. The drum 25 is fixedly mounted upon a shaft 30 so as to rotate with the shaft, the latter being journaled in suitable bearings contained within the casings 31 and 32 respectively carried by the end plates 10 and 11. The plates 11 and 12 are spaced so as to provide a chamber within which is disposed an actuating gear 33 for driving the drum or spool 25.

The gear 33 is mounted upon a suitable stub shaft 34, the shaft being journaled in a bearing mounted in a hollow projection 35 secured to the end plate 11. An arm 36 is fixedly secured to the shaft 34 being held thereon by means of a nut 37. The ends of the arm 36 carry stub shafts 38 upon which are revolubly mounted finger grip portions or knobs 40, the arm and shafts 38 forming a double ended crank for rotating the gear 33. The driving gear 33 is enmeshed with a relatively small gear or pinion 42 arranged to drive the shaft 30 carrying the drum or spool 25. The chamber accommodating the gears 33 and 42 is enclosed by means of an annular band 43 disposed between the plates 11 and 12.

The present invention is inclusive of a means for setting up a braking force or drag to retard the spinning of the drum or spool 25. To this end the frame or end plate 10 is formed with a radial slot 44 adapted to accommodate a stub shaft or rivet 45 upon which is pivotally or loosely supported a pawl or member 46. The shaft 45 is provided with a head 47 which rests against the pawl 46 as shown in Figure 6. A manipulating button or knob is pressed or otherwise fixedly secured on the portion of the rivet 45 extending exteriorly of the frame end plate 10. The knob 48 provides a manipulating means for moving the shaft 45 and pawl 46 radially toward or away from the axis of the spool or drum 25. The pawl member 46 is provided with an apex 49 formed by converging surfaces 50 and 51. The converging surfaces provide a wedge-like configuration adapted to be interengaged with the teeth 52 of a toothed wheel 53 secured to the shaft 30 and which is adapted to rotate with the spool or drum 25. The pawl 46 is formed with recesses 54 and 55 each forming the terminus of one of the converging surfaces of the pawl.

Means are provided cooperating with the pawl for attaining the results hereinafter explained. As particularly shown in Figures 3 through 6 there is disposed adjacent the plate 10 a resilient means in the form of an annularly shaped member 57 formed with an extending flange 58 which is secured to the plate 10 by means of rivets 59. The annularly-shaped member 57 is split forming end portions 62 and 63 which are normally out of alignment as shown in Figure 3 viz. the end portion 62 being nearer the axis of shaft 30 than the end portion 63. It will be noted from Figure 3 that when the pawl 46 is manually adjusted to its innermost position, the end portion 63 of the resilient means fits into the base or bight of the recess 55 while the end portion 62 is adjacent the end or terminus of the converging surface 51 at the entrance of the recess 54. The constructional arrangement and disposition of the end portions of the resilient member 57 and the respective points of engagement with the pawl 46 providing a means whereby rotation of the spool or drum 25 in one direction is retarded by reason of the engagement of the pawl with the toothed wheel 53 while rotation of the spool or drum in the opposite direction operates to automatically cause a disengagement of the pawl 46 from the toothed wheel 53.

The operation of the arrangement of my invention is as follows:

A supply of fishing line (not shown) is wound upon the drum or spool 25 in a conventional manner. The drum 25 is adapted to be rotated in either direction by the user manipulating one of the knobs 40 transmitting motion through the crank or arm 36 to the shaft 34 and large gear 33, the large gear 33, being enmeshed with the smaller gear 42 on the shaft 30, results in rotation of the spool 25. When the drag or braking pawl 46 is in inoperative position, that is, when the stub shaft or rivet 45 is in the outermost position in the slot 44 the pawl is out of the path of movement of the toothed wheel 53, the drum or spool is then free to spin unretarded in either direction of rotation.

When it is desired to bring the drag or motion retarding means for the spool into operation, the user moves the manipulating knob or button 48 carried by the rivet 45 to its innermost position, that is, closer to the axis of the spool 25, which movement brings the wedge-like portion of the pawl 46 formed by the converging walls 50 and 51 into the path of movement of the teeth on the wheel 53, the parts in this position being illustrated in Figures 2, 4 and 6. It is desirable that the drag or braking mechanism be effective when the fishing line is "played out" or unwound from the spool 25 as when a fish has been caught upon the lure or other instrumentality carried at the end of the fishing line. This "playing out" of the line takes place in the direction of the arrow "A" illustrated in Figure 4 causing rotation of the drum 25 and the toothed wheel 53 in a counter-clockwise direction as viewed in Figures 4 and 5. During the rotation of the spool in a counter-clockwise direction, the pawl 46 remains in engagement with the teeth of the wheel 53 under the influence of the resiliency of the spring 57 as the end portion 63 thereof rests in the bight of the recess 55 yet permitting the pawl to override the teeth of the wheel 53 as the latter pivots about the shaft or rivet 45 without disengaging the pawl from the teeth of the wheel 53. This pivotal action of the pawl is illustrated in dotted lines in Figure 4.

When the user of the reel rotates the spool 25 in the opposite direction in order to "reel in" the line, winding the same upon the spool 25, the spool and toothed wheel 53 rotate in a clockwise direction as viewed in Figures 4 and 5, the line being wound upon the spool in the direction of the arrow "B" illustrated in Figure 5. Due to the engagement of the end 62 of the spring 57 contacting the pawl 46 adjacent the juncture of the recess 54 and the rear terminus of the converging surface 51 thereof, the tooth of the wheel 53 then in engagement with the pawl forces the latter outwardly, the end 62 of the spring riding over the land formed by the juncture of the wall of the recess 54 with the pawl surface 51 so that the end of the spring 62 engaging the surface 51 biases the pawl in a direction to completely disengage the pawl from the toothed wheel 53 thus permitting free or unretarded rotation of the drum 25 as far as the drag or braking mechanism is concerned. By this means the drag or retarding means will only be effective when the line is played out and the spool is rotating in one direction while reverse movement of the spool to wind the line upon the latter instantly disengages the pawl 46 from the wheel 53 rendering the retarding means ineffective. This arrangement is not only simple and effective in its operation, but it eliminates the noise or "clicking" of the drag when the line is being wound up and also minimizes wear of the pawl 46 and the teeth of the wheel 53. Furthermore the release of the drag or pawl from engagement with the wheel 53 is entirely automatic and is effected instantaneously upon initial rotation of the spool 25 in a direction to wind the line thereon.

It is apparent that, within the scope of the invention, modifications and different arrangements may be made other than is herein disclosed, and the present disclosure is illustrative merely, the invention comprehending all variations thereof.

What I claim is:

1. In a fishing reel, in combination, a frame; a line receiving spool journaled on the frame; means for rotating the spool in both directions; a toothed wheel rotatable with the spool; a member movably supported on the frame; a pawl pivotally supported upon said member; said pawl having two converging surfaces; a recess formed in said pawl adjacent each of said converging surfaces; resilient means having portions engageable with said pawl, one of said portions extending into one of the recesses in the pawl for resiliently maintaining the apex formed by the converging surfaces in engagement with the toothed wheel when said pawl and member have been manually moved toward said wheel and during rotation of said spool in one direction, the other portion of said resilient means engaging said pawl at a point spaced a greater distance from the pivotal support than the point of engagement of the other portion of the resilient means with the pawl whereby rotation of said spool in a reverse direction automatically moves said pawl out of engagement with the toothed wheel.

2. In a fishing reel, in combination, a frame; a line receiving spool journaled on the frame; means for rotating the spool in both directions; a toothed wheel rotatable with the spool; said frame being formed with a slot; a member manually movable in said slot; a pawl pivotally supported upon said member; said pawl having two converging surfaces forming a wedge-shaped portion; a recess formed in said pawl adjacent each of said converging surfaces; a resilient member of annular configuration having end portions engageable with said pawl, one of said end portions extending into one of the recesses in the pawl for resiliently maintaining the wedge-shaped portion thereof in engagement with the toothed wheel when said pawl and member have been manually moved toward said wheel during rotation of said spool in one direction, the other end of said resilient member engaging said pawl at a point adjacent to but out of registration with the opposite recess in the pawl whereby rotation of said spool in a reverse direction biases said pawl out of engagement with the toothed wheel.

EDWARD L. ZIENTOWSKI.

REFERENCES CITED

The following references are of record in the file of this patent:

UNITED STATES PATENTS

| Number | Name | Date |
|---|---|---|
| 271,166 | Von Hofe | Jan. 23, 1883 |
| 422,786 | Holzmann | Mar. 4, 1890 |
| 485,794 | Hendricks | Nov. 8, 1892 |
| 734,959 | Rockwell | July 28, 1903 |
| 996,348 | Kramer | June 27, 1911 |
| 1,095,624 | Catucci | May 5, 1914 |

FOREIGN PATENTS

| Number | Country | Date |
|---|---|---|
| 132,670 | Great Britain | Sept. 25, 1919 |